Jan. 16, 1934.    M. ZAIGER ET AL    1,944,051
WINDSHIELD WIPER
Filed Aug. 23, 1932
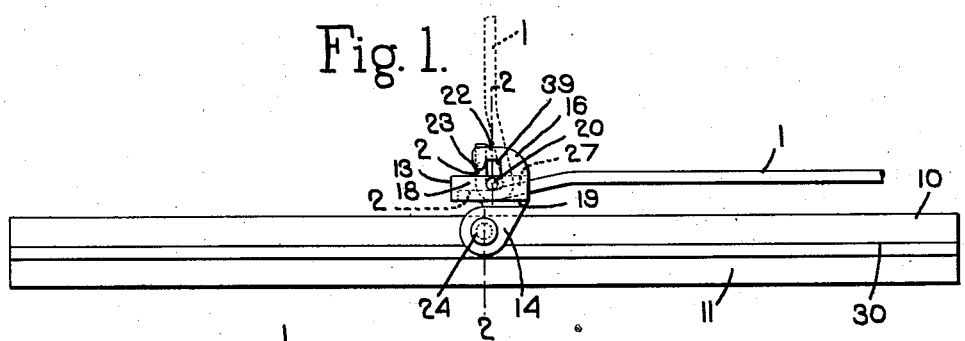
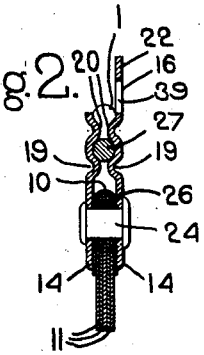
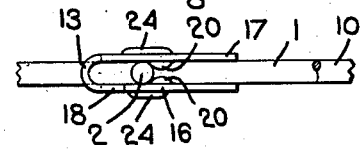
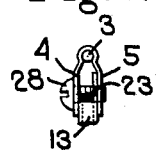
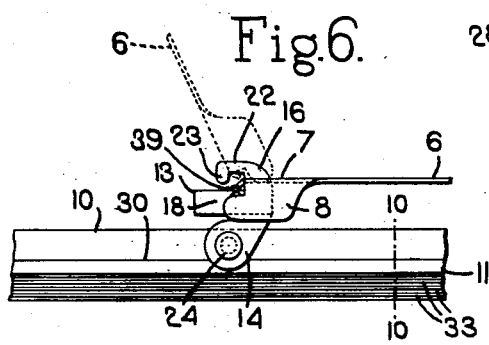
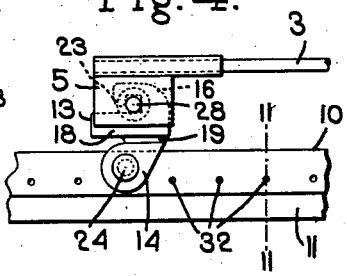
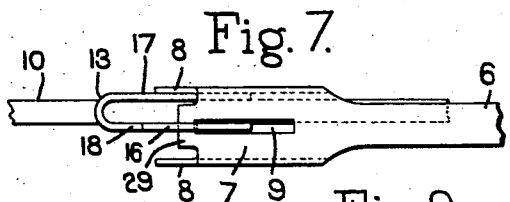
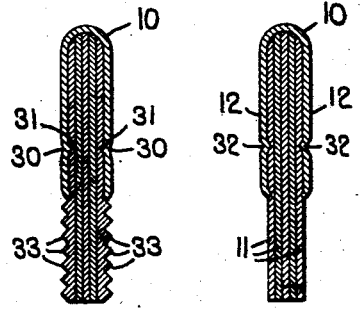
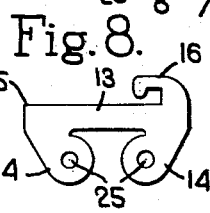
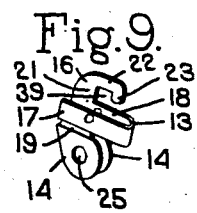
Inventors.
Max Zaiger
Louis Zaiger Patented Jan. 16, 1934

1,944,051

UNITED STATES PATENT OFFICE 1,944,051

WINDSHIELD WIPER

Max Zaiger, Swampscott, and Louis Zaiger, Lynn, Mass.

Application August 23, 1932. Serial No. 630,048

6 Claims. (Cl. 15—250)

This invention relates to windshield wipers for automobiles and has for its particular object to provide an improved windshield wiper blade which is adapted to be used with wiper arms of different constructions.

Some windshield wipers have a wiper arm in the form of a rod having its end bent laterally to give the end of the rod a general L shape. Other windshield wipers have a wiper arm provided at its end with a U-shaped attaching member adapted to embrace the wiper blade. Some other windshield wipers have a wiper arm having a flattened end which is provided with an aperture to receive a hook element secured to the wiper blade.

Wiper blades are usually made to fit only one of these wiper arms. Wiper blades frequently need replacing and as most wiper blades now on the market will fit only one type of wiper arm it is necessary for the purchaser of the wiper blade to be careful that he obtains a wiper blade of the proper construction to fit the particular type of wiper arm to which it is to be applied.

One of the objects of our invention is to provide an improved wiper blade which is universal in that it is constructed so that it can be used equally well with any one of the different types of wiper arms with which automobiles are now equipped.

In order to give an understanding of the invention we have illustrated in the drawing a selected embodiment thereof which will now be described after which the novel features will be pointed out in the appended claims.

Fig. 1 is a view of a windshield wiper blade embodying our invention showing it applied to a wiper arm of one type;

Fig. 2 is an enlarged section on the line 2—2, Fig. 1;

Fig. 3 is a top plan view of Fig. 1;

Fig. 4 is a fragmentary view showing the windshield wiper blade embodying our invention as used in connection with a different type of wiper arm;

Fig. 5 is an end view of Fig. 4 looking to the right;

Fig. 6 is a fragmentary view illustrating a wiper blade embodying our invention as used in connection with still another type of wiper arm;

Fig. 7 is an enlarged plan view of Fig. 6;

Fig. 8 shows the blank from which the attaching clip of our improved wiper is formed;

Fig. 9 is a perspective view of the clip;

Fig. 10 is an enlarged section on the line 10—10, Fig. 6;

Fig. 11 is a section on the line 11—11, Fig. 4.

We have shown in the drawing windshield wiper arms of three different types, all of which are more or less commonly used in windshield wipers. In Fig. 1 the windshield wiper arm is indicated at 1 and is in the form of a rod which is provided at its end with a laterally-bent portion 2 thus giving the end of the arm an L shape. In Fig. 4 we have shown a portion of a windshield wiper arm comprising a rod 3 having secured to its end a U-shaped attaching member presenting the two sides or cheeks 4 and 5 which are intended to embrace the wiper blade and to be secured thereto.

In Figs. 6 and 7 we have shown a wiper arm in the form of a flat strip 6 of spring metal, the end 7 of which is widened out somewhat and is provided with the depending ears 8, said widened portion having the slot 9 to receive a hook-like projection extending from the wiper blade. The above represent three of the most commonly-used wiper arms of windshield wipers that are now in use.

As stated above our wiper blade is constructed so that it can be used equally well with any one of these wiper arms.

The wiper blade is formed with the metal backing element 10 which is U-shaped in cross section and the flexible wiping strips 11, which are preferably of soft rubber, which are confined between the legs 12 of the backing and the edges of which project beyond the backing to form a flexible wiping portion, this being a common construction of windshield wipers.

For attaching this wiper element to the wiper arm we have provided a novel clip device which can be used equally well with any one of the three forms of wiper arms illustrated. One form of the clip device is shown best in Fig. 9 and it comprises a U-shaped body portion 13 and an attaching ear 14 extending laterally from each side portion or leg of the U-shaped body. The clip can be conveniently made from a blank 15 such as shown in Fig. 8. This blank has the body portion 13 with the two ears 14 extending laterally from each end thereof, and it also has the hook portion 16 extending from one end thereof on the side thereof opposite to the ear 14.

In making the clip this body portion 13 of the blank is bent centrally so as to form the U-shaped body portion 13 of the clip as illustrated in Fig. 9, which presents the two parallel legs 17 and 18, and by this operation the two ears 14 are brought into parallel but spaced relation. In making the clip it will be formed on each side with an indentation or groove 19 at the point where each ear joins the corresponding leg and each leg 17 and 18 will also be formed at its inner face with an inwardly-extending projection or protuberance 20, said protuberances being located opposite each other as best seen in Figs. 3 and 9. The improved clip may be described as having two side portions spaced from each other with the space between the side portions open at the top of the clip from one end to the other thereof and with each side portion provided with the ear that overlies and is attached to the holder, one at least of the side portions having on its inner face an inwardly-directed protuberance or projection spaced laterally from the other side portion by a distance less than the thickness of the arm and operative to position the wiper arm with respect to the clip.

These protuberances may conveniently be formed by upsetting or deforming the material of each leg and they form a partially-closed or restricted throat for the space between the legs 17 and 18 and the bend of the U.

The hook-shaped extension 16 presents the laterally-extending portion 21, the forwardly-extending portion 22 which is parallel to the leg 18 and the downwardly-directed lip or portion 23 which gives the extension 16 its hook shape.

The clip is applied to the wiper blade element 10 by assembling it therewith with the ears 14 embracing the backing 10 of the element. The clip may be fastened to the wiper blade by a screw or rivet 24 which extends through apertures 25 formed in the ears and an aperture 26 with which the wiper blade is usually provided. In the construction shown the clip is shown as riveted to the holder. In attaching the clip to the holder the ears 14 will embrace the holder tightly so that there can be no wobbling or flopping of the blade within the clip. When the clip is in place on the holder the legs 17, 18 of the clip extend in the direction of the length of the holder. In other words, the length dimension of the legs 17, 18, i. e., the dimension from the ends of the legs to the bridge of the U shape, extends substantially parallel to or at least in the direction of the length of the holder or backing element 10. The space between the legs or side portions 17, 18 of the clip is, therefore. open from one end to the other of the legs and the bridge of the U shape is at one end of the clip.

In order to attach the blade to a wiper arm such as shown in Fig. 1, the wiper arm and blade will be given a relative position as indicated in the dotted line position of the wiper arm in Fig. 1, and the bent end 2 of the wiper arm will be inserted between the legs 17 and 18 of the clip from the open end thereof and between the protuberances 20 and the ribs formed by the grooves 19 as shown in dotted lines Fig. 1, after which the wiper arm and wiper blade may be brought into the relative position shown in full lines. When in this position the end 27 of the shank or body of the arm 1 will enter between the legs 17, 18 of the U-shaped clip and will be located between the protuberances and the interior ribs formed by the grooves 19, and the laterally-bent end 2 of the wiper arm will project upwardly between the legs 17 and 18 at a point between the protuberances 20 and the bend of the U.

The wiper arm is thus spaced from the holder 10 and the pressure of the wiper arm which tends to hold the blade against the windshield glass is transmitted through said ribs.

The clip is so designed that the space between the legs 17 and 18 corresponds to the size of the rod and hence when the clip is attached to the rod the fit between the rod and the legs of the clip is such that there is no flop or lateral play between these parts. The extremity of the bent end 2 of the wiper arm lies against the end of the hook portion 16 as shown best in Fig. 1. The fact that the bent end 2 of the wiper arm is confined between the protuberances 20 on the one hand and the bend of the U-shaped body on the other serves to retain the parts in their operative position and prevents the clip from becoming disconnected from the wiper arm.

The legs 17, 18 of the clip are intended to fit snugly against the opposite sides of the wiper arm 1 and its bent end 2 and we will preferably make said legs slightly resilient so that they will yield to receive a wiper arm having a somewhat larger diameter than that shown in the drawing. In other words, by making the legs resilient the clip will snugly fit wiper arms of different diameters.

It will be observed from Figs. 6, 8 and 9 that the ears 14 are rounded beyond the legs and the grooves 19, such that the rounded edges will be substantially equidistant at all points from the attaching means or rivet 24, which extends through the opening 25. This is a point of material advantage in that it prevents any edge of the clip or ears thereof from projecting beyond the edge of the backing member 10. In prior art constructions where it has been conventional to provide rectangular shaped lugs or ears, a slight relative movement between the conventional clip and the back of the wiper blade would bring a corner of such clip beyond the edge of the backing and tend to break the rubber or scratch the windshield. This objection is avoided by the structure just mentioned.

A wiper blade such as above described is attached to a wiper arm having the construction shown in Figs. 4 and 5 by placing the body of the clip between the two legs 4 and 5 of the U-shaped attaching element and then inserting an attaching screw 28 through the holes in the legs 4 and 5 and through the opening 39 partially enclosed by the hook-shaped member 16. In most wiper arms having this construction the aperture in the leg 5 is screw threaded so that an attaching screw may be inserted through the aperture in the leg 4 and screw threaded into the screw-threaded aperture in the leg 5.

To attach the wiper blade to a wiper arm having the construction shown in Figs. 6 and 7 the hook portion 16 of the clip is made use of. In this construction the attachment may be made by turning the wiper arm 6 and the wiper blade into the relative positions shown by the dotted line position of the arm 6 in Fig. 6 and while in this position inserting the bent end 29 of the wiper arm beneath the nose 23 of the hook portion and causing said hook portion to enter the slot or opening 9. The wiper arm and blade may then be turned into the relative positions shown by full lines, in which position the two cheeks or sides 8 of the wiper arm embrace the clip and the hook portion 16 projects through the opening 9.

The bent end 29 provides a guard which prevents the clip and wiper arm from becoming dissociated except by swinging the wiper arm into the relative position shown in dotted lines Fig. 6.

In order to more securely retain the flexible wiping strips in the metal holder we propose to distort the legs 12 of the holder to cause them to have a biting or gripping action on the flexible strip 7. This can be done by providing each leg of the holder with a longitudinal indentation or groove 30 which results in upsetting the inner face of each leg to form a rib 31 which becomes embedded in the rubber strip, thus more firmly clamping them in the holder.

Another way of accomplishing this end is to provide the legs of the holder 10 with indentations 32 as shown in Figs. 4 and 11.

If desired, the outer faces of the outer plies may be provided with a plurality of longitudinal ribs 33 as shown in Figs. 6 and 10. These ribs tend to produce a more efficient wiping action.

We claim:

1. A windshield wiper blade comprising a holder U-shaped in cross section, flexible wiping strips mounted in the holder, a clip by which the holder is secured to a wiper arm, said clip presenting a U-shaped body portion, an attaching ear extending downward laterally from each leg of the body portion, means for securing the ears to the holder with an ear on each side of the holder and with the legs of the body portion extending substantially parallel to the holder, one of said legs having on its upper edge a hook-shaped extension adapted to enter the slot in the end of a flat resilient wiper arm.

2. A windshield wiper blade comprising a holder U-shaped in cross section, flexible wiping strips mounted in the holder, a clip by which the holder is secured to the wiper arm, said clip presenting a U-shaped body portion, an attaching ear extending laterally from each leg of the body portion, means for securing the ears to the holder with an ear adjacent each side of the holder and with the legs of the body portion extending in the direction of the length of the holder, at least one of said legs having on its inner face an inwardly directed projection spaced laterally from the other leg, and effective to position the wiper arm with respect to the clip, the space between the legs at any projection being less than the thickness of said arm.

3. A windshield wiper blade comprising a holder U-shaped in cross section, flexible wiping strips mounted in the holder, a clip by which the holder is secured to the wiper arm, said clip presenting a U-shaped body portion, an attaching ear extending laterally from each leg of the body portion, means for securing the ears to the holder with an ear adjacent each side of the holder, each leg having on its inner face an inwardly directed projection spaced laterally from the other leg, and effective to position the wiper arm with respect to the clip, the space between the legs at any projection being less than the thickness of said arm.

4. A windshield wiper blade comprising a holder U-shaped in cross section, flexible wiping strips mounted in the holder, a clip by which the holder is secured to a wiper arm, said clip having two connected spaced side portions with the space between said side portions open at the top of the clip from one end to the other, each side portion being provided with an attaching ear extending downwardly therefrom and adapted to overlie said holder, and means for securing said ears to the holder with an ear on each side of the holder, one of said side members having on its upper edge a hook-shaped extension adapted to enter the slot in the end of a flat resilient wiper arm and retain said clip on said arm.

5. A windshield wiper blade comprising a holder U-shaped in cross section, flexible wiping strips mounted in the holder, a clip by which the holder is secured to a wiper arm, said clip having two side portions spaced from each other, an attaching ear extending downwardly from each side portion, means for securing said ears to the holder with an ear on each side of the holder, the space between said side portions being open at the top of the clip from one end to the other thereof, each side portion being provided on its inner face with inwardly-directed projections for retaining the wiper arm in said clip, the space between said side portions at any projection being less than the thickness of said arm.

6. A windshield wiper blade comprising a holder U-shaped in cross section, flexible wiping strips mounted in the holder, a clip by which the holder is secured to a wiper arm, said clip being formed of a piece of sheet metal bent into a U shape to present two leg portions connected at one end by a bridge portion having substantially the same width as the leg portions, and an attaching ear extending downwardly from the lower edge of each leg portion, said holder being located between said ears, means for attaching said holder to said ears, the length dimension of the said legs extending in the direction of the length of the holder, and the width dimension of the bridge portion extending at right angles to the holder, one at least of said legs having on its inner face an inwardly-directed projection spaced laterally from the other leg and effective to position the wiper arm with respect to the clip, the space between the legs at such projection being less than the thickness of said arm, said bridge portion providing a resilient connection between the arms, whereby said legs may yield sufficiently to accommodate wiper arms of different thickness.

MAX ZAIGER.
LOUIS ZAIGER.